United States Patent [19]

Madsen et al.

[11] 4,347,061

[45] Aug. 31, 1982

[54] LIQUID FUEL COMPOSITION, METHOD OF PREPARING SAID COMPOSITION AND EMULSIFIER

[75] Inventors: Rud F. Madsen; W. Kofod Nielsen; Ole Hansen, all of Nakskov, Denmark

[73] Assignee: Aktieselskabet de Danske Sukkerfabrikker, Copenhagen, Denmark

[21] Appl. No.: 152,745

[22] Filed: May 23, 1980

[30] Foreign Application Priority Data

May 28, 1979 [DK] Denmark .................. 2198/79

[51] Int. Cl.³ ................................ C10L 1/32
[52] U.S. Cl. ................................ 44/51; 44/56;
  252/309; 252/312
[58] Field of Search .......... 44/51, 56; 252/309, 252/312

[56] References Cited

U.S. PATENT DOCUMENTS

| | | | |
|---|---|---|---|
| 12,936 | 5/1855 | Gesner | 44/56 |
| 1,663,323 | 3/1928 | Whatmough | 252/312 |
| 2,429,707 | 10/1947 | Catalano | 44/56 |
| 3,822,119 | 7/1974 | Frech et al. | 44/56 |
| 4,046,519 | 9/1977 | Piotrowski | 44/51 |
| 4,153,421 | 5/1979 | Marlin | 44/51 |
| 4,154,580 | 5/1979 | Landis | 44/56 |

FOREIGN PATENT DOCUMENTS

| | | |
|---|---|---|
| 350528 | 8/1935 | Canada . |
| 869942 | 7/1971 | Canada . |
| 925293 | 5/1973 | Canada . |
| 719723 | 7/1942 | Fed. Rep. of Germany . |
| 251969 | 4/1927 | United Kingdom . |
| 257886 | 7/1927 | United Kingdom . |
| 2002400 | 2/1979 | United Kingdom . |

*Primary Examiner*—Winston A. Douglas
*Assistant Examiner*—Y. Harris-Smith
*Attorney, Agent, or Firm*—Watson, Cole, Grindle & Watson

[57] ABSTRACT

A liquid fuel composition consisting of a stable emulsion of (a) a mineral fuel oil, (b) methanol or an aqueous solution of methanol, saccharose or a starch decomposition product, and (c) a polymeric emulsifier.

The fuel composition is prepared by emulsifying the three components in a homogenizer or an ultrasonic generator.

The fuel composition has a viscosity of the same order as that of the mineral fuel oil and the utilization of calories contained in the fuel composition is higher than that of pure mineral fuel oil when used as a fuel for a diesel engine.

A polymeric emulsifier is prepared by esterifying a naturally occurring polymer containing free hydroxy groups with a fatty acid or with a condensation product of a hydroxy fatty acid.

12 Claims, No Drawings

LIQUID FUEL COMPOSITION, METHOD OF PREPARING SAID COMPOSITION AND EMULSIFIER

BACKGROUND OF THE INVENTION

This invention relates to a liquid fuel composition comprising a liquid mineral fuel, such as a diesel oil and a light fuel oil and a non-mineral combustible liquid material.

The increasing need for liquid mineral fuels and the high price increases for crude oil demanded by the oil-producing countries during recent years have created a need for developing new fuels in which part of the costly mineral fuel is replaced by combustible materials derived from sources other crude oil.

Such extenders for liquid mineral fuels should be capable of being admixed with the liquid mineral oil so as to form a stable mixture, e.g., an emulsion, which mixture can be stored for long periods of time at relatively low temperatures without phase separation. Furthermore, the mixture should have a viscosity of the same order as that of the mineral liquid fuel.

The German patent specification No. 719,723 discloses a diesel fuel composition comprising diesel oil and sulphite waste liquor. The use of a sulphite waste liquor which is strongly alkaline has not, however, been successful because it causes serious corrosion problems.

SUMMARY OF THE INVENTION

It has been found that by using a special type of emulsifier, products of vegetable origin can be emulsified in a liquid mineral fuel to form stable emulsions which are fully satisfactory for use in diesel engines and in oil burners.

Thus, the liquid fuel composition of the invention comprises a stable emulsion of a liquid mineral fuel, methanol or an aqueous solution of a product selected from a group consisting of methanol, saccharose, starch decomposition products and mixtures thereof and at least one polymeric emulsifier.

The term "emulsion" as used herein comprises both genuine emulsions, media in which the particles of methanol or the aqueous solution are of such a size that they can be detected in the mineral fuel component as well as media in which said particles are of such a small size that the media are in the nature of solutions.

It is surprising that the emulsions of the invention are stable and that the viscosity of such emulsions is of the same order as that of the liquid fuel because it is well known that emulsions obtained by emulsifying aqueous solutions in some oils are unstable and that the viscosity of such emulsions is ordinarily very high.

The surprisingly low viscosity of the emulsion of the invention is evidenced by the fact that an emulsion consisting of 73% by weight of a diesel oil having a viscosity at 25° C. of 3.1 cp, 25% by weight of a glucose syrup having a viscosity at 25° C. of 325 cp and 2% emulsifier has a viscosity at 25° C. of 4.8 cp.

The surprisingly low viscosity of the emulsion of the invention is even more evident when the emulsion is prepared from the above-mentioned components in the following relative amounts:

48% by weight of diesel oil, 50% by weight of glucose syrup and 2% by weight of emulsifier. The viscosity at 25° C. of the emulsion thus obtained is 15.1 cp.

Methanol and solutions of carbohydrates (syrups) obtained by starch conversion processes are preferred vegetable components of the emulsions of the invention. Such solutions contain relatively small amounts of ash and are suitable for use in diesel engines and oil burners, especially oil burners for domestic use.

Thus, a glucose syrup containing about 70% by weight of carbohydrates and about 30% by weight of water emulsified in diesel oil in a ratio of 1:1 has been successfully used in a diesel engine with minor adjustments of the fuel injection.

The fuel economy of an emulsion of the invention containing a syrup of the above-mentioned type is extremely good. Thus, it has been found that a diesel car which was driven at a constant speed of 100 km/hour ran 17.8 km/kg when using a fuel composed of 20% by weight of an aqueous glucose syrup having a dry matter content of 70%, 79% by weight of diesel oil and 1% by weight of emulsifier, whereas it ran 18.1 km/kg when using ordinary diesel oil.

This is surprising when it is taken into consideration that the calorific value of ordinary diesel oil is 10130 kcal/kg, whereas it is only 8730 kcal/kg for a emulsion of the above-mentioned type.

Thus, it can be concluded that the utilization of the calories of diesel oil is improved as a result of the addition of syrup. This improvement is not merely due to the presence of water because an emulsion of diesel oil and water in a concentration of 10% is less effective than the syrup-containing emulsion.

Also, oil burners, such as domestic oil burners for central heating plants, have been found to operate fully satisfactory and with a perfect flame when using the fuel composition of the invention.

Starch decomposition products prepared by acid or enzymatic decomposition of starch are preferred products for use in the fuel composition of the invention. The dry matter content of such syrups should preferably be at least 65% by weight.

The conversion degree (DE-value) of the starch conversion syrups is non-critical, but in practice it has been found that syrups having a DE-value of about 40, e.g., 42, are preferred.

Syrups having higher DE-values, e.g., about 90, are also suitable, but are more expensive.

Fuel compositions of the invention containing up to 60% by weight of starch conversion syrups have been prepared, but ordinarily it is preferred to use syrup in an amount of from 10 to 50% and most preferred about 25% by weight of the total amount of mineral fuel and syrup.

The polymeric emulsifier is preferably of a non-ionic type. A preferred type of emulsifiers is commercially available under the trade names "RAPISOL" polymeric surfactant B 246 and B 261 (supplied by ICI Europa Limited, Everberg, Belgium). "RAPISOL" B 246 and B 261 are a block copolymer or a grafted copolymer dissolved in xylene. These copolymers have the general formula $(A\text{-}COO)_m\text{-}B$, wherein m is an integer of at least 2, wherein each polymer component A has a molecular weight of at least 500 and is the residue of an oil soluble complex monocarboxylic acid and wherein each polymer component B has a molecular weight of at least 500 and in case m is equal to 2 is the divalent residue of a water-soluble polyalkylene glycol and in case m is higher than 2 is the residue having the valency m of a water-soluble polyether polyol.

The invention also relates to a novel type of polymers which are suitable as surface active agents in liquid systems containing an oil phase and an aqueous phase and which are particularly suitable for use as emulsifiers in the fuel composition of the invention. These novel polymers are obtained by esterifying a naturally occurring polymer containing free hydroxy groups, such as starch, dextrins, cellulose and hemicellulose and decomposition products thereof with a fatty acid, such as stearic acid and oleic acid or a condensation product of a hydroxy fatty acid, such as 12-hydroxy stearic acid and ricinolic acid, or the corresponding acid chlorides or anhydrides.

The emulsifier is preferably used in an amount of from 1 to 10% by weight based on the weight of the aqueous solution.

When using sacchrose solutions and syrups obtained by the decomposition of starch, it may be desirable to incorporate into the emulsion a material inhibiting the crystallization of sugars.

In a preferred fuel composition of the invention the aqueous solution comprises both saccharose and a glucose syrup. Thus, the latter comprises compounds inhibiting the crystallization of saccharose.

It may be desirable to add to the emulsion other additives. Examples of such additives are antioxidants, additives preventing bacterial growth, such as toluene, and additional surface active agents. Examples of such surface active agents are calcium stearate, kollidon, polyethylene oxide and lignin.

The invention also relates to a method of preparing the fuel compositions described above.

According to the method of the invention methanol or an aqueous solution of a product selected from the group consisting of methanol, saccharose, starch decomposition products and mixtures thereof is emulsified in a liquid mineral fuel in the presence of at least one polymeric emulsifier.

The preparation of the emulsion may be effected in a homogenizer and preferably by using a high pressure pump comprising a homogenizer head of the type used for the homogenization of milk. The pump pressure should preferably be 300–400 bars.

In another method of preparing the emulsion, methanol or the aqueous solution is emulsified in the mineral fuel by subjecting a mixture of the three components to form the emulsion to the influence of ultrasonic waves. The effect produced by the ultrasonic generator used should preferably exceed 600 W.

The use of ultrasonic energy for the homogenization of the mixture of the three components presents several advantages. Thus, the operation can be carried out at atmospheric pressure or slightly above, the introduction of air into the emulsion is avoided and the temperature increase produced is insignificant.

The invention will now be described in further detail with reference to the following examples.

EXAMPLE 1

An aqueous glucose syrup obtained by starch hydrolysis and having a dry matter content of 70% by weight was emulsified in ordinary diesel oil in the presence of a polymeric emulsifier to form an emulsion consisting of 25% by weight of said glucose syrup, 72.75% by weight of diesel oil and 2.25% by weight of emulsifier ("RAPISOL" B 261).

EXAMPLE 2

The aqueous glucose syrup according to example 1 was emulsified in diesel oil to form an emulsion consisting of 50% by weight of said glucose syrup, 48% by weight of diesel oil and 2% by weight of emulsifier ("RAPISOL" B 261).

The emulsions prepared as described in examples 1 and 2 were used as a fuel for a 10 HP "Bukh" diesel engine, the injection system of which had been slightly modified. The engine operated satisfactorily on both fuels and no harmful deposits in the engine were observed.

The stability of the emulsions prepared according to examples 1 and 2 was investigated by allowing the emulsions to stand in a graduated glass container for a week and by observing the phase separation produced. No or only a slight phase separation was observed.

After 14 days a thin layer of a concentrated emulsion could be observed in the emulsion at the bottom of the glass container. This layer was easily removed by stirring which indicates that no actual phase separation had taken place and that the layer at the bottom merely comprises large droplets of the glucose syrup.

EXAMPLE 3

A glucose syrup having a DE-value of 42 was mixed with a saccharose solution to form an aqueous solution containing about 70% by weight of dry matter of which 10% by weight originate from the glucose syrup.

The mixture was emulsified in diesel oil in the presence of a polymeric emulsifier so as to form an emulsion consisting of 79% by weight of diesel oil, 20% by weight of said mixture and 1% by weight of emulsifier ("RAPISOL" B 246). The stability of the emulsion was satisfactory which was evidenced by the fact that only a slight phase separation could be observed after storage of the emulsion for one week.

EXAMPLE 4

An emulsion was prepared by emulsifying 20% by weight of methanol in 79% diesel oil in the presence of 1% by weight of a polymeric emulsifier ("RAPISOL" B 261).

After standing for one week only a slight phase separation could be observed.

EXAMPLE 5

5 g of dextrin were reacted with 5 g of stearic acid chloride in the presence of p-toluene sulphonic acid acting as a catalyst in a solvent consisting of N-methylpyrrolidone. The reaction was carried out at a temperature of 60° C. for 24 hours. The solvent was removed by evaporation and about 4 g of residue were obtained. 20% by weight of a glucose syrup having a DE-value of 42 were emulsified in 78% by weight of diesel oil in the presence of 2% by weight of the polymeric reaction product obtained as described above. Only a slight phase separation could be observed after storage for one week.

EXAMPLE 6

A polyester was prepared by condensing 12-hydroxystearic acid at a temperature of 150° C. for a period sufficient to obtain a acid number of less than 40 KOH/g. 5 g of the polyester thus formed were reacted with 5 g dextrin for 24 hours at a temperature of 70° C. The yield of the reaction product thus obtained was 3 g. 20% by weight of a glucose syrup having a DE-value of 42 were emulsified in 78% by weight of diesel oil in the presence of 2% by weight of the polymeric reaction product obtained as described above. Only a slight phase separation could be observed after storage for one week.

EXAMPLE 7

Different fuel compositions of the invention and ordinary diesel oil were tested on a diesel engine.

All fuel compositions of the invention were composed of diesel oil, a glucose syrup having a DE-value of 42 and a polymeric emulsifier ("RAPISOL" B 246). The composition were prepared by passing a mixture of the components through a homogenizer valve. All compositions of the invention contained 5% by weight of emulsifier based on the weight of the glucose syrup. Thus, a 30% emulsion consists of 30% by weight of syrup, 1.5% by weight of emulsifier and 68.5% by weight of diesel oil.

The data obtained will appear from the following table.

TABLE

| Fuel | Engine load (kp) | Effect (HP) | Fuel consumption kg/h | $\frac{HPh}{kg}$ | Effective calorific value 1000 kcal/kg | HPh/Effective calorific value | Δ% (*) |
|---|---|---|---|---|---|---|---|
| Diesel Oil | 1.5 | 1.778 | 0.647 | 2.750 | 10.13 | 0.271 | — |
| Diesel oil | 1.0 | 1.190 | 0.480 | 2.478 | 10.13 | 0.245 | — |
| Diesel oil | 0.52 | 0.614 | 0.368 | 1.670 | 10.13 | 0.165 | — |
| 10% emulsion | 1.5 | 1.763 | 0.678 | 2.600 | 9.51 | 0.273 | 0.7 |
| 10% emulsion | 1.0 | 1.180 | 0.503 | 2.347 | 9.51 | 0.247 | 0.8 |
| 20% emulsion | 1.5 | 1.778 | 0.712 | 2.500 | 8.73 | 0.286 | 5.5 |
| 20% emulsion | 1.0 | 1.190 | 0.555 | 2.143 | 8.73 | 0.245 | 0 |
| 20% emulsion | 0.52 | 0.611 | 0.414 | 1.473 | 8.73 | 0.169 | 2.4 |
| 30% emulsion | 1.54 | 1.817 | 0.776 | 2.341 | 7.89 | 0.297 | 9.6 |
| 30% emulsion | 0.98 | 1.156 | 0.559 | 2.074 | 7.89 | 0.263 | 7.3 |
| 30% emulsion | 0.50 | 0.595 | 0.446 | 1.337 | 7.89 | 0.169 | 2.4 |
| 50% emulsion | 1.5 | 1.763 | 0.821 | 2.145 | 6.47 | 0.332 | 22.5 |
| 50% emulsion | 1.05 | 1.234 | 0.619 | 1.989 | 6.47 | 0.307 | 25.3 |

(*) Δ% is the deviation of the ratio of HPh to effective calorific value from that of pure diesel oil and expressed in percentages.

Since the efficiency of the engine is low, the absolute values of the utilization of the calories of the fuel are less interesting than the relative values, Δ%.

If the energy of the carbohydrates contained in the fuel compositions of the invention is fully utilized, Δ% should be zero. A Δ%-value exceeding zero shows that the utilization of the calories of a fuel containing syrups is higher than that of pure diesel oil. As will appear from the table the utilization of the fuel is improved by emulsifying syrup in diesel oil and is extraordinary high when using a fuel containing 50% by weight of a syrup.

The combustion efficiency was also evaluated by measuring the concentration of soot particles in the exhaust gases from the diesel engine with a photocell. Surprisingly, it was found that the concentration decreases with increasing amounts of syrup emulsified in the diesel oil.

This also indicates that the combustion of the fuel is improved with increasing amounts of syrup in the emulsion.

We claim:

1. A liquid fuel composition comprising a stable emulsion of a liquid mineral oil fuel, an aqueous solution of a product selected from the group consisting of saccharose, starch decomposition products and mixtures thereof, and at least one non-ionic polymeric emulsifier.

2. A liquid fuel composition as in claim 1, wherein said liquid fuel composition includes a glucose syrup emulsified in a liquid mineral oil fuel.

3. A liquid fuel composition as in claim 2, wherein said glucose syrup contains at least 65% by weight of dry matter.

4. A liquid fuel composition as in claim 2, wherein said glucose syrup is present in an amount of about 10% to 50% by weight, based on the total weight of liquid mineral oil fuel and glucose syrup.

5. A liquid fuel composition as in claim 4, wherein said glucose syrup is present in an amount of about 25% by weight, based on the total weight of liquid mineral oil fuel and glucose syrup.

6. A liquid fuel composition as in claim 1, wherein said liquid mineral oil is diesel oil.

7. A liquid fuel composition as in claim 1, wherein said polymeric emulsifier is a block copolymer or grafted copolymer, said copolymer having the general formula $(A\text{-}COO)_m\text{-}B$, wherein m is an integer of at least 2, wherein each polymer component A has a molecular weight of at least 500 and is the residue of an oil soluble complex monocarboxylic acid and wherein each polymer component B has a molecular weight of at least 500 and in case m is equal to 2 is the divalent residue of a water soluble polyalkylene glycol and in case m is higher than 2 is a residue having the valency m of a water soluble polyether polyol.

8. A liquid fuel composition as in claim 1, wherein said polymeric emulsifier is a polymer obtained by esterifying a naturally occurring polymer containing free hydroxy groups with a fatty acid or a condensation product of a hydroxy fatty acid, or the corresponding acid chlorides or anhydrides.

9. A liquid fuel composition as in claim 8, wherein the naturally occurring polymer containing free hydroxy groups is a dextrin.

10. A method of preparing a liquid fuel composition as in claim 1, comprising emulsifying an aqueous solution of a product selected from the group consisting of saccharose, starch decomposition products and mixtures thereof in a liquid mineral oil fuel in the presence of at least one polymeric emulsifier.

11. A method as in claim 10, wherein a mixture of the three components is emulsified in a homogenizer.

12. A method as in claim 10, wherein a mixture of the three components is emulsified by means of ultrasonic waves.

* * * * *